Nov. 4, 1969　　　H. SCHENCK ETAL　　　3,476,651
CONVEYING COKING APPARATUS WITH A DOWNWARDLY EXTENDING
TUBULAR HEATING MEANS
Filed Sept. 6, 1966　　　　　　　　　　　　7 Sheets-Sheet 1

INVENTORS
*HERMANN SCHENCK*
*WERNER WENZEL*
BY
ATTORNEYS

Nov. 4, 1969  H. SCHENCK ETAL  3,476,651
CONVEYING COKING APPARATUS WITH A DOWNWARDLY EXTENDING
TUBULAR HEATING MEANS
Filed Sept. 6, 1966  7 Sheets-Sheet 5

INVENTORS
HERMANN SCHENCK
WERNER WENZEL
BY
ATTORNEYS

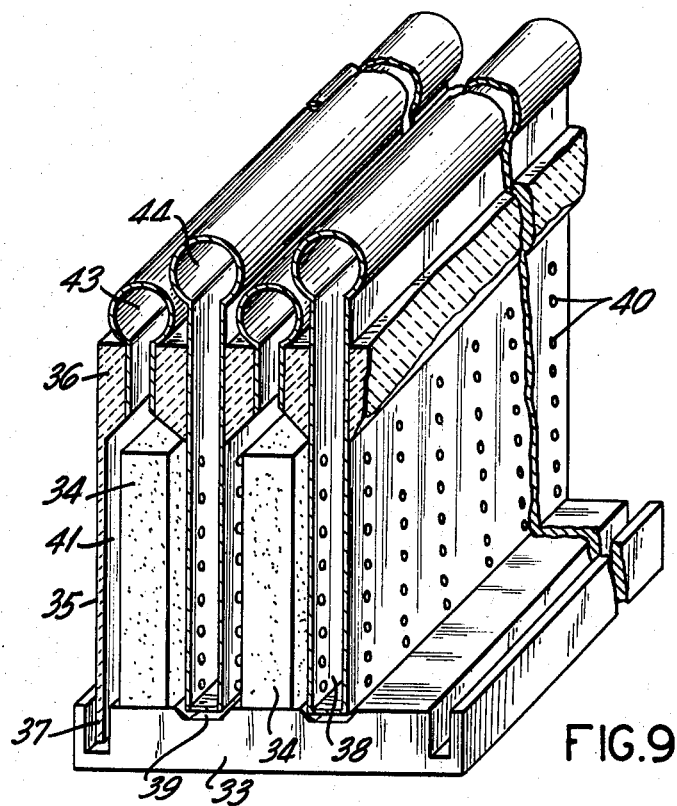

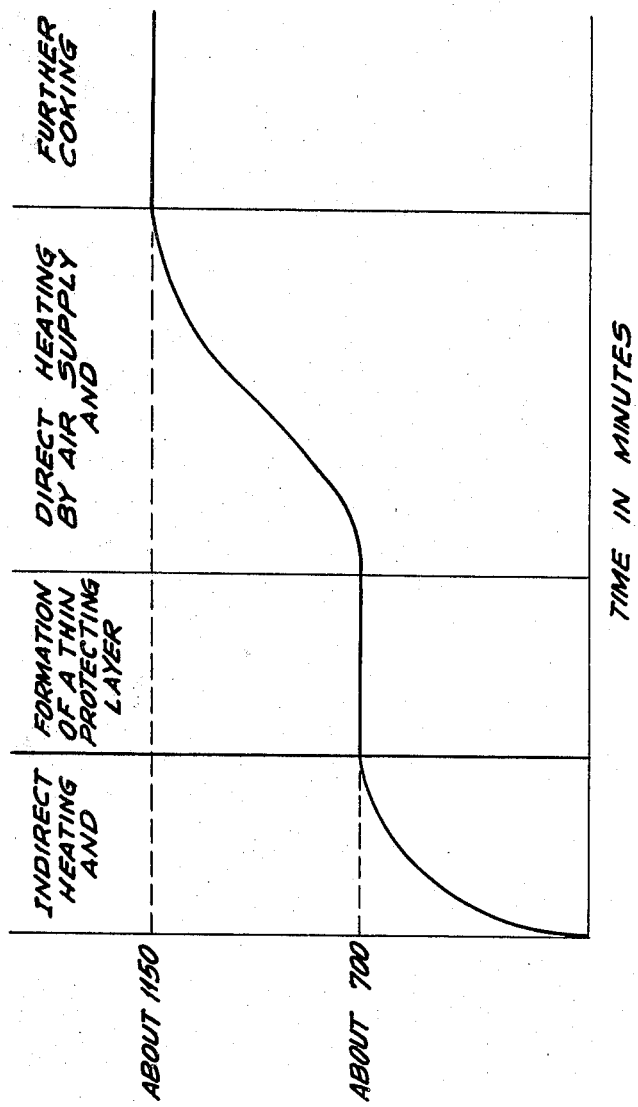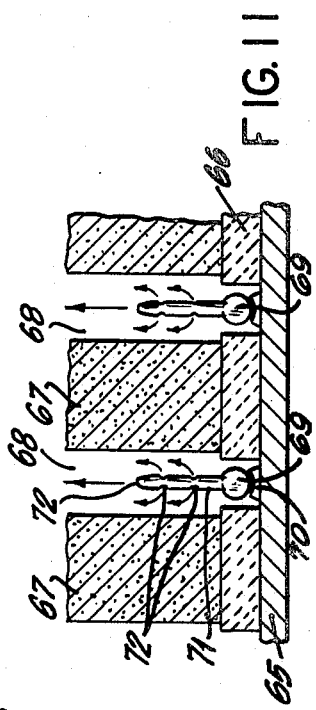

3,476,651
CONVEYING COKING APPARATUS WITH A DOWNWARDLY EXTENDING TUBULAR HEATING MEANS

Hermann Schenck, Intzestrasse 1, and Werner Wenzel, Prinz Heinrich Strasse 29, both of Aachen, Germany
Filed Sept. 6, 1966, Ser. No. 577,368
Int. Cl. C10b 7/06, 47/20
U.S. Cl. 202—117
15 Claims

ABSTRACT OF THE DISCLOSURE

A coking plant is formed of a horizontally arranged support member moving longitudinally between an inlet station and a discharge station. A plurality of coal bodies are positioned on the support member in spaced relationship to provide longitudinally extending open spaces between adjacent coal bodies. A hollow member is provided at the inlet station of the coking plant for supplying gas and combustion air into the open spaces for initiating the coking of the coal bodies. Tubular members extend downwardly into the open spaces for supplying combustion air and a gas collecting ceiling is arranged to remove gas from the plant.

---

This invention generally relates to coke production and is particularly directed to a novel and improved method and apparatus for the continuous production of coke from bituminous coal.

The customary method for the production of coke from bituminous coal is the so-called chambed coking method. This prior art method, however, requires considerable expenditure and investment from a technical and operational point of view, due to its discontinuous mode of operation, the required two-space heating and the necessary long carbonizing periods. For this reason, various attempts have been made during recent times to develop new coking procedures which obviate the above-mentioned disadvantages of the customary and classic chamber coking method.

It has thus been attempted to coke coal in a continuous manner by spreading the coal on a support surface of a support which is in the form of endless rotating grates. According to this prior art attempt, chambers or the like arrangements for the supply of air were provided below the grate, while, above the grate, chambers or vaults were provided for igniting the coal layer and for discharging combustion—or partially burned gases which are obtained after the ignition during the progressive coking of the coal.

A serious disadvantage of this procedure is that the coal can be arranged on the grate support in very low layer thicknesses only which, in most instances, are limited to a few centimeters. Further, compacting and expanding fine coal particles have a tendency to form a compact layer which is insufficiently gas permeable. For this reason, it has not been possible to coke such coal in a complete manner, so that only a small moiety of, for example, 2 to 4% of volatile components, remains in the coal. Coking coals have not been successfully coked according to this last-mentioned procedure.

It has furthermore become known to compress or compact the coal prior to the coking proper and to place the compacted coal bodies thus obtained in the form of briquets or the like on the grate whereafter the coking is performed with these briquets or bodies. However, the above-mentioned difficulties encountered in the coking procedure on the grate, due to the presence of compacting and expanding coal particles, were not overcome by the preceding compacting procedure.

In the continuous coking of bitumen containing slates, it has been proposed to use so-called tunnel furnaces. In such procedures, the slate to be coked is spread in the form of a layer on a car, whereupon the loaded cars, whose upper loading surface is provided with heat insulating materials, are, one after the other, conveyed through a trap or sluice into the coking tunnel and are again moved out at the other end of the tunnel through a gas sluice or trap. The sealing of the moved upper surface of the cars, which thus serve as support for the oil slate, is accomplished in this procedure by means of channels or troughs which run along the tunnel walls, lateral projections or abutments of the loading surfaces of the cars projecting into these channels or troughs. As sealing agent, sand or the like is used which to a large extent fills the channels or troughs.

All the prior art equipment for the continuous coking of bituminous coal, irrespective of whether it comprises grates, plate grates, belts or cars for supporting the coal to be coked, is lacking means which make sure that (a) The gas traverses the material to be coked in a controllable manner;

(b) Rapid and controllable ignition of the coal surface takes place; and (c) A controllable supply of combustion air after ignition and during the entire coking procedure and a controllable supply of combustion gases and air are available.

It has previously been suggested not to leave to chance the configuration of the coal surfaces which are exposed to the ignition and to provide deliberate means for controlling the ignition proper. For this purpose, a regular system of channels or passages in a uniformly compacted carbon layer has been created with the ignition being accomplished by an igniting tube system which was inserted into the channels or passages and which was charged with constant quantities of gas and air. In this manner, constant conditions for the initiation of the coking were created. In the procedure referred to, the continued coking takes place in known manner by supplied air amounts which are introduced into the channels through a grate situated below the coal layer. These air amounts, however, could only very roughly and incompletely be adapted to the local requirements of air of the coking coal layer which prevail at any given moment. The same applies for the supply of combustion gases during the degassification and also during the last phase of the coking, to wit, at a time when only very small amounts of combustible degassing or coking gases are obtained from the coal and the required coking heat is furnished by additional gas and the coking process is brought to an end.

An additional disadvantage of the prior art process is that when relatively thick coal layers are to be coked, a non-uniform heating of the cross section of the layer is obtained. For this reason, the coke ultimately obtained is not satisfactory in respect to its quality. Thus, for example, its content of volatile components fluctuates to a considerable extent.

A still further disadvantage of the known procedures is that they require grate structures of relatively cumbersome and thus expensive construction which moreover have a tendency to break down and thus require frequent repair. This applies particularly to prior art coking procedures which make use of movable grates.

Accordingly, it is a primary object of the present invention to overcome the disadvantages of the prior art procedures and equipment and to provide a method and apparatus for continuously coking bituminous coal so as to obtain coke of superior quality.

Another object of the invention is to provide a method of the indicated kind which is simple to carry out.

Generally, it is an object of this invention to improve on the art of coking bituminous coal as presently practiced.

In accordance with this invention, it has been found that coke of uniform and superior quality is continuously obtained from preferably pre-shaped bodies of bituminous coal, even if the coal is employed at considerable layer thickness of, for example 100 centimeters or more, provided certain conditions are adhered to. In the inventive procedure, uniformly moved belts or cars are used as support surfaces on which the coal bodies, by partial combustion of the degassing gases (hereinafter referred to as coking gases), are heated and equipment is provided for the discharge of the off-gases. The conditions, which have to be adhered to in order to continuously obtain high quality coke, in accordance with the invention, are as follows: the coal bodies are arranged on the support with constant distances or interspaces. The surfaces of the coal bodies which face the spaces are ignited adjacent the feed or inlet end of the coking plant by igniting means or elements which are stationarily arranged in the spaces and which are charged with the required quantities of gas and igniting air. The igniting elements may be box-shaped igniting members or igniting tubes. The controlled supply of combustion air and/or heating gas is accomplished by supply members which are installed along the coking path within the spaces referred to. The coking procedure proper takes place in the inventive method in an analogous manner to the chamber coking method, to wit, large block-shaped coal bodies which, for example, may have the dimensions of 300 x 3,000 mm. are heated, starting at their boundary surface and progressing inwardly.

The supply elements for the combustion air and heating gas may, for example, be constructed in the form of gas chambers which hang down, from a gas collecting ceiling of the coking plant, into the interspaces between the coal bodies. These gas supply chambers are provided with gas exit openings through which the air and gas passes directly for contact with the coal bodies to be coked.

It is also feasible to provide at the gas collecting ceiling of the coking equipment, above the interspaces, a pipe system with vertical branch lines which end closely above the support surface, which branch lines are equipped with exit apertures oriented toward the coal surfaces.

These supply lines may also be equipped with upwardly oriented branch lines having gas exit apertures directed toward the coal surfaces, in which event the length of the branch lines is adapted to the height of the coal charge which is supported on the support. In such event, the pipe lines extend closely above the support for the coal bodies.

In order to protect the supply pipes, which are inserted into interspaces, against strong heat effects which are due to the combustion within the interspaces, the supply pipes are preferably accommodated in trench-like depressions which are arranged on the plate belt in, for example, refractory ceramic linings.

Since the pipes are stationarily arranged and rest on the moving support, special measures are required in order to decrease the frictional forces and to minimize the wear on the pipes caused by friction. These measures are, for example, in the form of rolls or friction bearing members which are arranged on the supports at distances of about one meter, which rolls or members are rigidly connected with the surface of the supports. These friction bearing members or rolls may consist of sintered metal whose pore spaces are filled with a lubricant as, for example, graphite.

The gas supply chambers or pipe lines, respectively, are sub-divided for the different purposes and are equipped with supply lines which are independent from each other. Throttling or shut-off members are, of course, also provided. In this manner, the specific amount of air or heating gas which is required for any given phase of the coking procedure can be correctly adjusted and combustion of the carbon is prevented.

A portion of the box-shaped members or pipes which are installed in the interspaces may also be constructed so as to be suitable for the discharge of coking gases.

It is particularly favorable for the flow conditions of the gaseous heating media and coking gases if there is an alternate arrangement of chamber sections and pipe sections for the supply of the heating media and for the discharge of coking gases or combustion gases, respectively.

In case the coal bodies are of great height or if several coal bodies of lesser height are stacked on top of each other, to wit, are arranged in superimposed condition, there exists the danger of their toppling or tilting during their movement on the support. Such toppling or tilting is securely prevented if a gas collecting ceiling is arranged closely adjacent above the coal bodies and if ribs are arranged on the ceiling which extend downwardly into the interspaces, thereby serving as guides for the coal bodies or coal body stacks.

In order to prevent escape of combustion gases from the coking arrangement, for example, when belts are used as supports, the interspaces between the red hot coke bodies are sealed by a gas blocking wall at the region of the belt where the coke is thrown off.

If cars are used for conveying the coal bodies through the coking equipment or furnace, special chambers, so-called gas traps or sluices may be arranged at the ends of the furnace in a known manner.

Pursuant to the invention, sealing chambers which fill the interspaces between the coal bodies at the ends of the plant are used which are particularly suitable for use with endless rotating belts.

The vertical longitudinal walls of the sealing chambers at the furnace entrance may be constricted obliquely in an inward or outward direction, depending on whether the coal bodies have a tendency to expand or to shrink during the coking procedure. The sealing chambers, as viewed from the entrance, may be provided with conically expanding or tapering base surfaces.

In accordance with the invention, the sealing chambers at the inlet or entrance end are also used for the indirect heating and surface coking of the carbon bodies. A heating gas in burnt in the chamber and the heated chamber walls coke the surface of the carbon bodies which snugly bear against these walls and move therealong. Due to the surface coking, the coal bodies are imparted with a hard coke shell of several millimeters thickness, and the coal body thus becomes more resistant in respect to mechanical stresses to which it is exposed during its movement through the furnace. The burnt gases which exit from the sealing chamber cause the coking arrangement to be sealed from the outside at the charging side of the coal bodies.

At the discharge or exit side, the remaining gap between the coke bodies and the sealing chamber is closed in accordance with the invention by inserting fine grained sealing material, preferably coke meal.

Experience has demonstrated that the coking procedure carried out with the inventive coking equipment renders it possible successfully and uniformly to coke layers of coal bodies of up to 2 meters height, so that a homogeneous coke with about 1 to 2% of volatile components is obtained.

The inventive procedure may be varied in different manner in order to obtain predetermined effects during the coking. For example, in a known manner, such as coke meal, may be added to the coal to be coked. In this manner, the expansion of the coal and thus the narrowing of the interspaces is effectively prevented.

Furthermore, it is also advantageous to increase the coal throughput of the inventive coking equipment, for example, by feeding the coal to the support in pre-heated condition.

In order to be able to coke coal material having a relatively low content of volatile components, it is within the scope of the present invention to introduce extraneous heating media as, for example, heating gas, heating oil or coal dust into the interspaces between the carbon bodies. This may be accomplished by blowing.

The effect of the inventive arrangement can be increased by intensifying the combustion and the heat transfer between the heating gas and the surface of the carbon bodies. This, for example, may be accomplished by pre-heating the combustion air, by enriching the combustion air with oxygen and by creating gas vibrations or oscillations in the combustion space. In this manner, it is possible, in accordance with this invention, to produce a coking gas of extremely high heating value, for example, a heating value having between 2000 and 3000 kcal./Nm.$^3$.

In addition to or instead of the combustion of fuels in the interspaces between the coal bodies, other possibilities for gnerating heat may be considered. For example, electrical heating bodies may be arranged to accomplish that purpose.

The surface of the supports on which the coal bodies are moved during the coking is preferably protected against heat influence. This may be accomplished by mounting a coat of ceramic or the like refractory material on the support surface.

One of the advantages of the novel procedure is that much thicker layers of coal bodies, to wit, coal bodies of 1 to 2 meters height, can be coked in a relatively short time. This has not been possible according to the prior art processes. Therefore, the inventive procedure is much more economical than the prior art procedures.

The various features of novelty which characterize the invention are pointed out with particularity in the claims annexed to and forming a part of this specification. For a better understanding of the invention, its operating advantages and specific objects attained by its use, reference should be had to the accompanying drawings in which there are illustrated and described preferred embodiments of the invention.

In the drawings:

FIGS. 1 through 3 and 11 refer to a coking plant in which belts are used as supports for the coal bodies, while FIGS. 4 through 10 have reference to coking arrangements wherein cars serve as supports.

More specifically:

FIG. 9 is a perspective representation of a longitudinal and cross fragment of the equipment of FIGS. 4 through 8;

FIG. 10 indicates the arrangement of three coking plants which are erected adjacent each other, wherein cars are used as supports for the coal bodies;

FIG. 11 is a vertical cross section through another embodiment of a coking plant of the invention, wherein the air and gas supply box members are replaced by pipe lines arranged within the interspaces; and FIG. 12 is a graph showing diagrammatically a particularly favorable temperature course for the coking plant.

Figure 1:
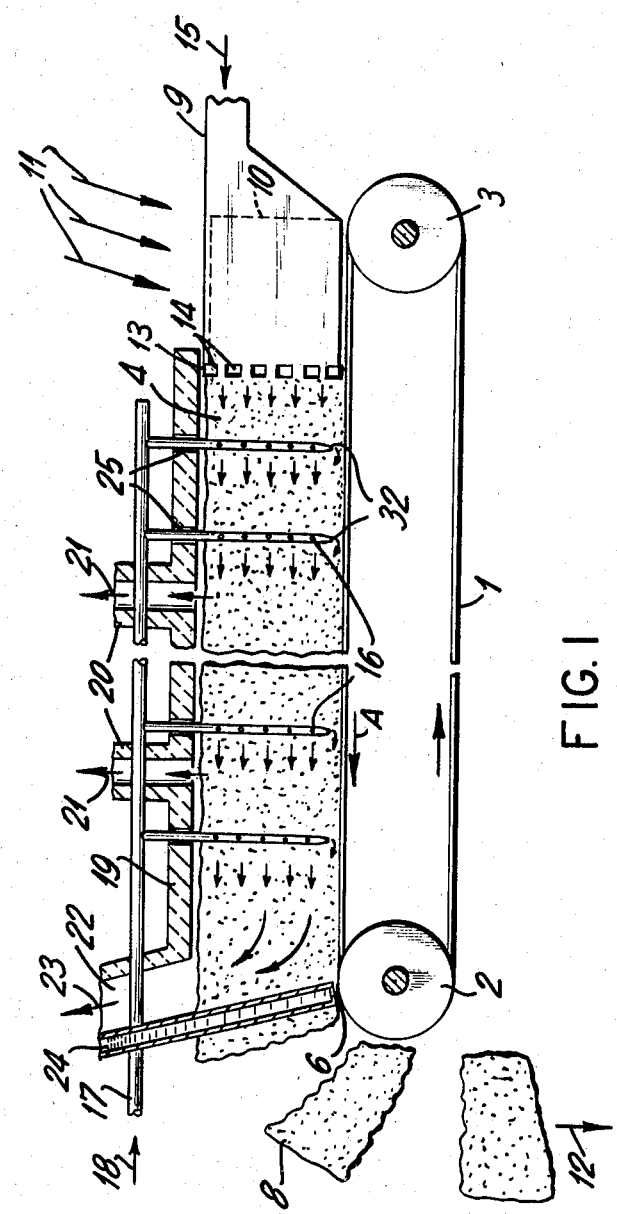
FIG. 1 is a vertical section through a continuous coking plant.
Figure 2:
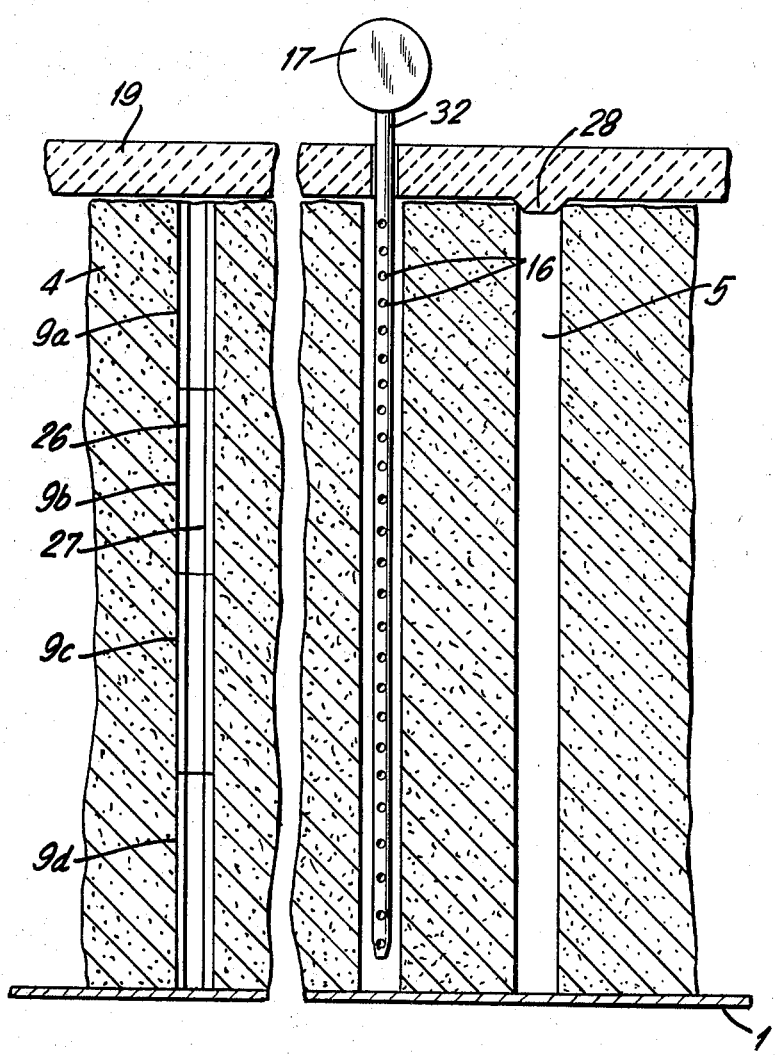
FIG. 2 is a vertical section which is placed perpendicular to the section of FIG. 1.
Figure 3:
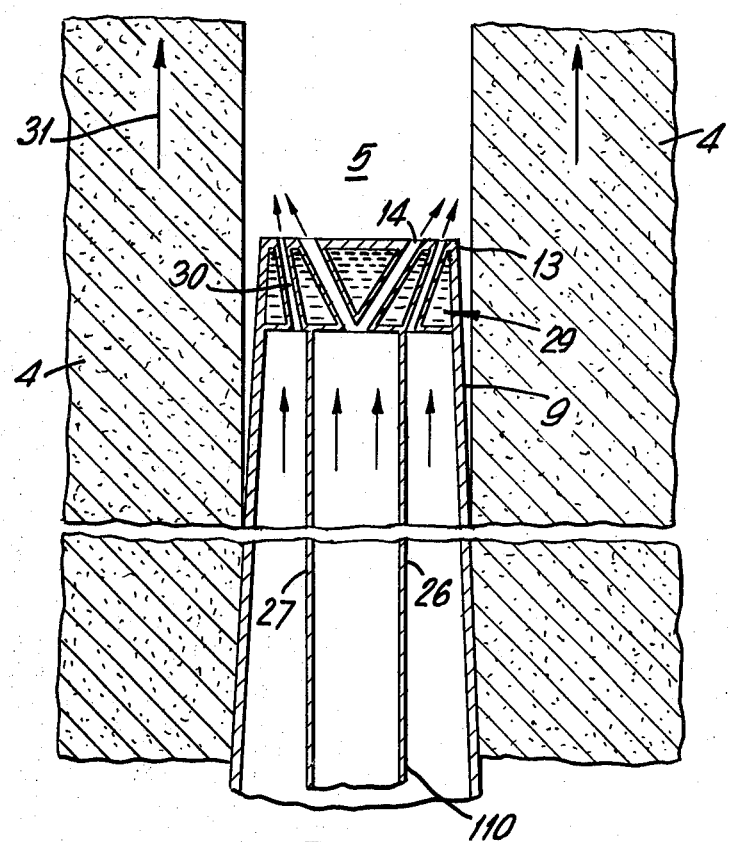
FIG. 3 is a horizontal partial section through FIG. 1, extending parallel to the belt 1, which section extends at half the height of the carbon bodies 4.

Referring now to the drawings and, in particular, to the embodiments of FIGS. 1 through 3, the support consists of an endless belt 1 which is trained around the rolls 2 and 3. Vertical to the plane of the drawing, several, for example, ten block-shaped or rectangular coal bodies 4 are arranged, interspaces 5 (see FIG. 2) being provided between any two adjacent coal bodies. The coal bodies move on the conveyor belt in the direction of the arrow A and are coked during this movement. At the lefthand end of the conveyor belt 1, as indicated by reference numeral 6, the bodies consist completely of coke. Since the belt 1 beyond point 6 moves in a downward direction around the roller 2, the coke bodies are, of course, deprived of their support and fall off the belt and break apart into individual pieces 8. Fresh coal bodies are constantly supplied to the feeding end of the belt so that continuous production is assured. The feeding of fresh coal bodies to the conveyor belt structure may be accomplished in different ways. According to one possibility, coal, without prior compaction, may be poured by means of suitable conveyor and hopper arrangements onto the belt 1 and may be compacted subsequently by tamping or the like. In order to make sure that the required interspaces 5 remain free between the adjacent coal bodies 4, box-like members 9 may be provided which, as shown in the embodiment of FIGS. 1 through 3, are stationarily arranged above the belt 1. These box-like members 9 have a height which corresponds to the height of the coal bodies to be produced, while the width of the members 9 is equal to the width of the interspaces 5 arranged between adjacent coal bodies. In FIG. 1, the coal bodies, while still outside the coking plant proper, are indicated by dashed lines 10. While being supported on the belt 1, they enter the coking plant proper between the box members 9. The direction indicated by the arrow 11 refers to the direction in which the coal bodies are charged on the belt 1. The direction indicated by arrow 12 refers to the direction of the discharge of the produced coke.

FIG. 1 also indicates the means for heating the coal bodies 4 by partial combustion of the coking gases which are formed during the coking. When the coal bodies, which are moved with the belt 1, emerge from the end side 13 of the box members 9, ignition of those surfaces of the coal bodies 4 which face the interspaces 5 takes place first. In order to effect the ignition, igniting gas and igniting air is passed through the box members 9 and toward the end side 13. This is accomplished in such a manner that, through opening 14 in the end side 13, gas and air are blown into the interspaces 5 and burn therewithin. In FIG. 1, the section through the box members 9 is placed so that the part of the box which guides the combustion air is sectioned. The combustion air enters the box 9 at the location of reference numeral 15. After the surfaces of the coal bodies 4 have been ignited in the vicinity of the end sides 13 of the box members, coking gas exits from these surfaces, whose partial combustion supplies the required coking heat. In order to carry out this partial combustion, air supply tubes or pipes 32 project from above into the interspaces 5. These air supply pipes 32 are provided over their entire immersion depth with air exit apertures 16. Due to the kind and arrangement of these air supply pipes over the entire belt length and due to the arrangement of the air exit apertures 16, a substantially uniformly distributed temperature is created in the interspaces 5. In this way, a most effective direct heating of the coal bodies 4 takes place which, in turn, results in a correspondingly rapid conversion of the coal into coke. The air supply pipes 32 branch off above the coal bodies 4 from larger main supply tubes 17. The arrow 18 indicates the direction in which the air is supplied to these main air supply tubes 17. The off-gas which is formed during the partial combustion of the coking gas is discharged upwardly from the interspaces 5 between the coal bodies 4. For this purpose, a gas collecting ceiling 19 is provided directly above the coal bodies 4. This ceiling 19 has, distributed over the length of the belt, several gas exits 20, from which the off-gas is discharged in the direction of the arrow 21. At the end of the belt, there is provided a main gas discharge opening 22 from which the major portion of the off-gas exits in the direction of the arrow 23. In order to prevent the escape of the off-gas into the free space below the belt, a gas-blocking means 24 is arranged at the end of the interspaces 5 and reaches down to the belt level while traversing the interspaces. In FIG. 1, this gas-blocking means 24 is constructed as a water-cooled box member. Several passages or bores 25 are provided in the gas-collecting ceiling 19 through which the air supply pipes 32 are placed.

The left side of FIG. 2 shows a section through the box members 9, while the right-hand side of the figure is a section through the heating part.

The interspace 5 is filled by the box members 9 which, as shown in this embodiment, for constructional reasons consist of several superimposed part box members 9a through 9d. Walls 26 and 27 are arranged within the box members 9 so that in the center portion of the box members the combustion air can be guided while in the outer portions of the box members the flow of the igniting gas takes place. The coking plant is upwardly closed by the gas collecting ceiling 19. In the right-hand portion of FIG. 2, the air supply tubes 32 are visible which are suspended within the interspaces 5 and which are provided with the air exit apertures 16. The main air supply tube 17 is also indicated in FIG. 2 from which lines 32 branch off. Above the interspaces 5, ribs 28 are arranged in the gas-collecting ceiling 19. These ribs project downwardly for several centimeters into the interspaces 5. They prevent that, for example, by shaking motion or the like, the coal bodies 4 topple over and thus block the interspaces 5 or would cause a nonuniform width of these interspaces.

The wall portion which adjoins the end side 13 of the box member 9 is provided with a water-cooling member 29 (see FIG. 3). The air exit holes or apertures 14 are passed through the cooling box member 29. Igniting combustion air is blown through these apertures 14 into the interspaces 5, which air passes through the center tube portion 110 of the box members 9. The gas exit openings 30 are arranged through the marginal portions of the cooling box member 29, through which openings 30 the igniting gases are blown into the interspaces 5. The igniting gases are thus supplied through the lateral compartments of the box members 9. The igniting flames which, in this manner, are formed in front of the end sides 13 of the box members 9 are directed toward the surfaces of the coal bodies 4, whereby these surfaces are brought to high temperatures and are thus ignited.

The igniting procedure of the surfaces of the coal bodies 4 takes plate as follows:

The coal bodies 4 which are placed on the belt on either side of box members 9 are moved together with the belt in the direction of the arrow 31. In order to make sure that the belt indeed carries along the coal bodies 4, projections or protuberances may be provided on the surface of the belt (not shown) which project into the coal bodies 4. As soon as the coal bodies 4 with their surfaces which are adjacent the interspaces 5 have moved past the end sides 13 of the box members 9, these surfaces enter the region of the igniting flames and are thus brought to a high temperature causing coking and degassing of the coal directly adjacent the surfaces. Thus, coking gas exits from the surfaces of the coal bodies 4 and enters the interspaces 5. This coking gas is then partially burned in the interspaces 5 in the manner previously described.

Figure 4:
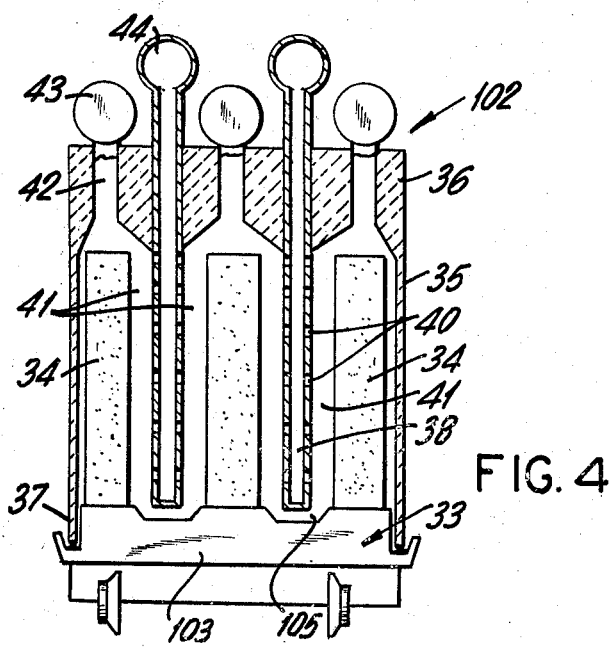
FIG. 4 is a vertical section extending perpendicular to the longitudinal axis of a different embodiment of a coking plant.

FIG. 4 represents a plant in which several coking cars 33 are continuously moved one behind the other through a coking tunnel 102. The block-shaped coal bodies 34 are supported on the platform 103 of the coking cars. These coal bodies 34 which in known manner are compacted from coal powder of fine particle size or which in any other manner have been brought into the shape here shown are arranged on the platform in spaced relationship, the spaces customarily being comparatively small. FIG. 4 shows a section which extends transversely to the coal blocks or bodies, which bodies extend vertically to the plane of the drawing in any suitable length.

The coking tunnel 102 through which the coking cars 33 are moved consists of stationarily arranged walls 35 and of the ceiling 36 which is integrally connected with the walls. The walls 35 and the ceiling 36 consists of heat insulating refractory material. The walls 35, at their lower end, engage in sealing members 37 of the coking cars 33. These sealing members consist of cup-shaped channels or troughs filled with sand. Box-shaped gas supply members 38 traverse the ceiling 36 of the tunnel and project into the tunnel space. These box-shaped gas supply members are rigidly connected with the tunnel ceiling. These gas supply members are in the form of chambers 38 which extend downwardly to the loading surface of the cars 33. At their lower end, these chambers extend into depressions 105 and thus subdivide the tunnel space into several coking paths through which the coal bodies 34, while being mounted on the cars 33, are moved. The air supply chambers 38, whose walls consist of metallic heat-resistant material or of ceramic material, have gas exit openings 40 at their sides which face the coal blocks 34.

Heating medium is directly introduced into the coking chambers 41 of the tunnel through these gas exit openings 40 from the gas supply chambers 38. In the coking chambers 41, this heating medium is in direct contact with the coal blocks 34 and heats their surfaces. The off-gas which is produced in this manner escapes from the coking chambers 41 through channels 42 which are arranged in and traverse the ceiling 36 of the tunnel furnace. This off-gas is discharged through the collecting lines 43. The heating of the coal bodies 34 and the coking chambers 41 may be effected either by a pre-prepared heating medium which is blown in through gas supply chambers 38, as, for example, flue gas or, in the alternative, it may be coking plant gas which is heated in a known manner. It is particularly advantageous, however, if the heat generation is effected in the coking chamber 41 proper. Thus, for example, heating gas and combustion air may be separately introduced into the coking chamber 41 through the correspondingly subdivided gas supply chambers 38 where the gas mixture is burned. However, the supply of heating gas can be eliminated entirely if merely combustion air is blown into the coking chamber 41 through the combustion chamber 38 by means of the exit openings 40. This combustion air then mixes with the evolved coking gases which enter from the coal bodies into the gap between the coal bodies and the walls of the gas supply chambers.

Reference numeral 44 indicates the air supply lines to the chambers 38.

If particularly high combustion temperatures are to be produced in the coking chambers 41 or if, in order to obtain off-gas rich in heating value, particularly small amounts of evolved coking gas of the coal are to be burned, it is advantageous to employ the combustion air which is supplied through the gas supply chamber in pre-heated form. For example, the pre-heating of the air can be effected to a temperature of 400 to 800° C. If the pre-heating of the air is considerable and the gas supply chambers 38 are made of metallic material, it is advantageous to keep the temperature of the walls as low as possible, to wit, the temperature should be maintained approximately at the same value as the temperature of the pre-heated air. This can be readily obtained by using correspondingly designed chamber cross sections, so that the air speed within the gas supply chambers is relatively great, for example, the speed is maintained between 30 to 100 meters per second.

The coking furnace is a tunnel of considerable length, with an entrance opening and a discharge opening. Through the entrance opening, the cars 33 are moved into the tunnel and are passed through the tunnel by means of known conveying means. The speed of the cars through the tunnel is adjusted so that when the coking cars exit from the tunnel, the coking of the coal bodies has just been completed. This coking procedure may also be accomplished in such a manner that when at the exit end a coking car is discharged from the tunnel with completely coked material, at the same time at the other end, to wit, the entrance end, a coking car with fresh coal blocks is inserted into the tunnel. This preserves the continuity of the procedure.

Figure 5:
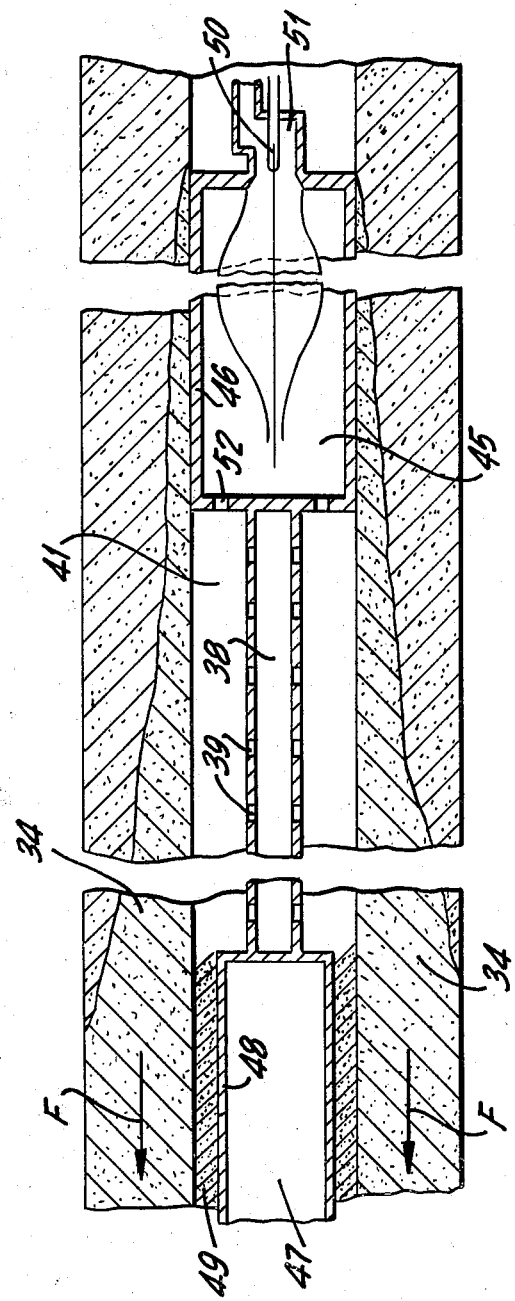
FIG. 5 is a horizontal section through the coking plant of FIG. 4.

In order to carry out the inventive procedure in a coking tunnel, a number of devices and measures are provided in accordance with the invention which render a continuous coking possible. The entrance and discharge ends of the coking tunnel are thus sealed so that no gases can escape from the tunnel at its end sides. FIG. 5 indicates such an arrangement. The coal blocks or bodies are moved in the direction of the arrow F. The outward sealing of the coking chamber 41 on the entrance side of the coal bodies is effected by means of a special sealing chamber 45 whose side walls 46 snugly bear against the surface of the coal bodies 34. At the discharge end of the coal bodies from the coking tunnel, there is also a sealing chamber 47 whose walls 48 normally no not bear against the lateral walls of the coal or coke body moved therealong. Due to the considerable roughness of these coke bodies, a special sealing is not necessary. A sufficient sealing is accomplished thereby that in the interspace between walls 48 and the surfaces of the coke bodies a sealing material 49 of fine particle size is inserted. Such material may, for example, consist of fine grain coke particles.

FIG. 5 also indicates the manner in which the sealing body 45 is used at the entrance or feed end of the coal bodies into the coking tunnel, to cause an indirect heating of the coal bodies and, in this manner, to produce a strong shell of coke on the surface of the coal bodies. The heating of the sealing chamber 45 is accomplished by burning a combustible gas mixture therein. Reference numeral 50 thus indicates the supply line for a gaseous fuel material, while 51 indicates the supply of combustion air into the chamber 45. The burnt gases exit from the sealing chamber through opening 52 and enter the coking chamber 41 between the coal body 34 and the gas supply chambers 38.

Upon discharging the off-gases from the coking chamber 41 through the exit openings 42, the gas velocity in the gap between the coal bodies 34 and that of the gas supply chamber 38 constantly increases upwardly. The uniform gas charge is obtained if the chambers 38 are sub-divided by vertical walls into several chambers which are separated from each other in such a manner that always a gas supply chamber alternates with a gas discharge chamber.

Figure 6:
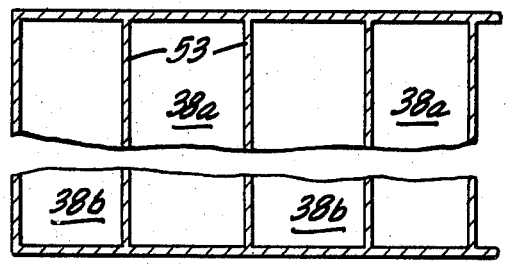
FIG. 6 is a horizontal section through the air and gas supply chamber and shows its subdivision into air and gas supply chambers.
Figure 7:
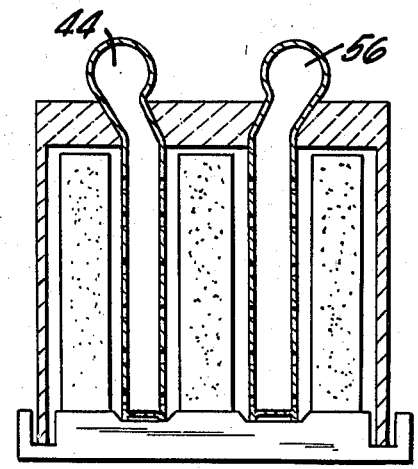
FIG. 7 is a vertical partial section through the air and gas supply chambers.
Figure 8:
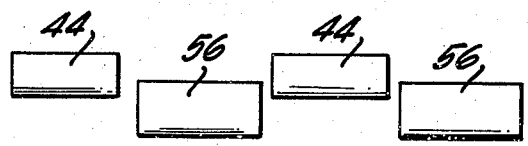
FIG. 8 is a plan view of the chamber according to FIG. 6.

FIGS. 6 through 8 show diagrammatically this form of the gas movement in the inventive procedure.

FIG. 6 thus indicates a chamber 38 which by means of the vertical walls 53 is sub-divided into air supply chambers 38a and gas discharge chambers 38b. The air supply chambers 38a have a common air supply line 44, while the gas discharge chambers 38b have the common gas discharge line 56 (FIG. 7).

The plan view of FIG. 8 shows two adjacent collecting lines 44 and 56 which extend through the upper bent portions of the gas-air supply chambers 38a and the gas discharge chambers 38b.

Further explanation of FIG. 9, which is a more illustrative representation of the arrangement, would appear to be redundant in view of the preceding description.

FIG. 10 shows the diagrammatic arrangement of a continuous tunnel furnace coking plant according to the invention consisting of three adjacently arranged tunnel furnaces. Reference numeral 57 is a plan view of the furnace unit in which the three individual tunnel furnaces are combined. The coking cars are inserted into the tunnel furnaces at 59 while moving on tracks 58 and are discharged from the furnace at 60. The tracks for the coking cars merge in front of and behind the furnace block 57 and the cars are moved on a bypass or recycling path 61 from the exit side 60 again to the entrance side 59. In the bypass path 61, there is provided a coal loading station 62 for the supply of coal blocks to the loading surface of the coking cars.

A preparing station 63 is also provided within which the coal blocks are subjected on the coking cars to several pre-treatments prior to being inserted into the coking tunnel proper. Such pre-treatments may, for example, consist of pre-heating in order to dry the coal or may consist in sprinkling the surface of the coal bodies with coal powder for the purpose of increasing gas production. It is also possible to pre-ignite the surfaces of the coal blocks by means of gas or oil burners in order to expedite the coking procedure within the tunnel.

A discharge station 64 is also provided on the track bypass path 61 behind the coking tunnels. In this discharge station 64, the coke blocks are removed from the surfaces of the coking cars. This discharge may, for example, be accomplished in known manner by using a tilting discharge means. This basic diagram may be changed in a different manner. For example, additional stations may be arranged on the track for servicing the coking cars and other purposes.

FIG. 11 shows the use of pipe systems 69 which are arranged in the interspaces 68 in order to supply air and gas to the coal surfaces and for the purpose of discharging coking gases from the coked coal bodies 67. These pipe systems rest on the plate strip or belt 65.

The belt is moved perpendicular to the plane of the drawing. The metallic surfaces of the plates, in order to protect them against overheating, are provided with ceramic coatings 66. The coal bodies 67 are mounted on these coatings. The pipes 69 are fixed in their position. They are situated directly above the ceramic coating of the plate grate. Gliding support bearings 70 for the pipes 69 are stationarily arranged on the ceramic coatings of the plate belt. The pipes 69 have branch portions 71 which are directed vertically upwardly. These branch portions 71 are provided with gas exit openings 72 for the blowing in of combustion air and/or heating gases.

FIG. 12 is a graph or diagram in respect to a particularly favorable heating course for the coal bodies. Experiments have indicated that the coking results are particularly favorable if a predetermined temperature-time programming of the coking course is adhered to. It is thus advantageous first to heat the surfaces of the coal bodies to be coked in such a manner that the temperature at 1 centimeter depth of the coal layer rises within about 20 minutes to about 600 to 700° C. For an additional 20 minutes, the temperature at this area is then maintained at the same level. Thereafter, the wall of the coal bodies is heated with the highest available temperature, for example, up to 1150° C. It has been shown to be particularly advantageous to provide for slow heating of the outer wall of the coal bodies by indirect heating, for example, in such a manner as indicated in FIG. 5. FIG. 12 is a diagrammatic representation of the temperature-time program for the coking course of the invention.

While specific embodiments of the invention have been shown and described in detail to illustrate the application of the inventive principles, it will be understood that the invention may be embodied otherwise without departing from such principles.

Example

In the described coking plant a coal of the following composition has been coked:

|  | Percent |
|---|---|
| Fixed carbon | 69.98 |
| Volatile matter | 23.35 |
| Ash | 5.21 |
| Moisture | 1.46 |

The coal used had a grain size of 0.01 to 10 mm., and had been compressed to coal bodies having a size of 400 x 350 x 130 mm. by applying a pressure of 200 kg./cm.²

A plurality of these coal bodies were placed in such a way on a moving car that walls were formed having a thickness of 130 mm. and a height of 1200 mm. The space between the numerous walls thus formed was maintained constant at 120 mm.

The ignition was effected by pressing a flame of coking gas and air for 21 minutes from above through the spaces formed by the coal bodies until the wall surface at its coldest point had a temperature of 600° C. After the ignition had been effected air was passed through the spaces from bottom to top by means of a pipe having upward directed air outlets, which was arranged stationary at the lower end of the spaces. This increased the temperature to 1,120° C. The coal was exposed to the coking temperature for a time of 150 minutes.

The coke produced had the following grain size:

|  | Percent |
|---|---|
| Under 20 mm. | 7.9 |
| 20–40 mm. | 15.1 |
| 40–60 mm. | 38.9 |
| 60–80 mm. | 30.9 |
| Over 80 mm. | 7.2 |

Proximate analysis:

|  | Percent |
|---|---|
| Fixed carbon | 90.82 |
| Volatile matter | 0.92 |
| Ash | 7.92 |
| Moisture | 0.34 |

The stability of the grain fraction 15 to 40 mm. was found to be 10.5 percent residue under 5 mm. after rotating in the test drum for 100 revolutions.

The amount of burning air was 0.9 to 1.1 Nm.³/kg. coal. The calorific value of the waste gas (sensible heat plus chemically fixed heat) amounted to 1,720 kcal./kg. coal.

What is claimed is:

1. A coking plant comprising a movable support member having a generally horizontally arranged support surface movable along a longitudinally extending path of travel between an inlet station and a discharge station, a plurality of stationary hollow members located above the support surface of said support member at the inlet station thereof, said hollow members extending in the longitudinal direction of the path of travel and being spaced apart in the direction transverse of the path of travel, the lower ends of said hollow members being spaced above and closely adjacent the support surface of said support member and extending upwardly therefrom, the support surface of said support member being arranged to support a plurality of coal bodies each having a width sufficient to pass between said hollow members, means for introducing gaseous medium through said hollow members and into contact with the surface of the coal bodies adjacent the inlet station for igniting the coal surfaces thereof adjacent the inlet station and causing the coking of the coal bodies as they move between the inlet and discharge station on said support member, stationary tubular members arranged to depend downwardly into the space between adjacent coal bodies for supplying air thereto, and means spaced upwardly from said support member for withdrawing off gases formed during the coking operation.

2. A coking plant, as claimed in claim 1, wherein said movable support member is an endless conveyor, and said support surface thereof being formed by a belt trained around roller means which are located adjacent the inlet station and discharge station of the plant.

3. A coking plant, as claimed in claim 1, wherein said support is in the form of a plurality of cars having coal body receiving platforms.

4. A coking plant, as set forth in claim 1, wherein partition means disposed within said hollow member for dividing it into at least one gas passage and one air passage, and the end of said hollow member having a plurality of gas openings and air openings for directing gas and air into the space between adjacent coal bodies from said gas and air passages.

5. A coking plant, as claimed in claim 1, wherein each of said pipe members have a plurality of vertically spaced outlet openings for discharging air throughout the height of the space between the coal bodies, and a common supply line located above the coal bodies and connected to each of said pipe members.

6. A coking plant, as claimed in claim 1, wherein a gas collecting ceiling located upwardly from said support member and arranged to be positioned above the coal bodies, and said means for withdrawing gas comprising ducts connected to and extending through said ceiling and extending upwardly therefrom.

7. A coking plant, as claimed in claim 1, wherein said means for introducing gaseous medium through said hollow members are in the form of pipes located in trough-like depressions on the support.

8. A coking plant according to claim 1, wherein said support surface has a refractory coating.

9. A coking plant, as claimed in claim 8, further comprising anti-friction means of sinter metal mounted on said refractory coating, said hollow members being pipes resting on said anti-friction means.

10. A coking plant, as claimed in claim 1, wherein said hollow members are divided into sections, alternate sections being provided with means for supplying gaseous medium and discharging off-gases, respectively.

11. A coking plant, as claimed in claim 1, further comprising a gas collecting ceiling above said support, ribs being provided on said ceiling, said ribs projecting downwardly between adjacent coal bodies to prevent toppling of the coal bodies.

12. A coking plant, as claimed in claim 1, wherein means located at the discharge station positioned above said support member and arranged to form a closure for the space between adjacent coal bodies for preventing the escape of gas therefrom.

13. A coking plant, as claimed in claim 1, further comprising sealing means adjacent the inlet and discharge ends of the coking plant, said sealing means being in the form of walls, the wall at the inlet end having a vertically extending portion which extends obliquely.

14. A coking plant, as claimed in claim 13, wherein the sealing means at the inlet end of the coking plant is heated.

15. A coking plant, as claimed in claim 4, wherein wall means forming a cooling box member are positioned at the end of said hollow member adjacent the inlet station, and said wall means forming ducts through said cooling box which are disposed obliquely to the longitudinal path of travel and communicate with the gas and air passages in said hollow member for supplying gas and air into the space between the coal bodies and directed at the surfaces of the coal bodies adjacent the inlet station.

References Cited

UNITED STATES PATENTS

| | | | |
|---|---|---|---|
| 1,911,473 | 5/1933 | Simpson | 201—32 XR |
| 1,952,363 | 3/1934 | Bunce et al. | 202—117 |

NORMAN YUDKOFF, Primary Examiner

D. EDWARDS, Assistant Examiner